Jan. 6, 1959
C. E. HURLBURT
2,867,122
GYRO CAGING MECHANISM
Filed May 28, 1956
2 Sheets-Sheet 1
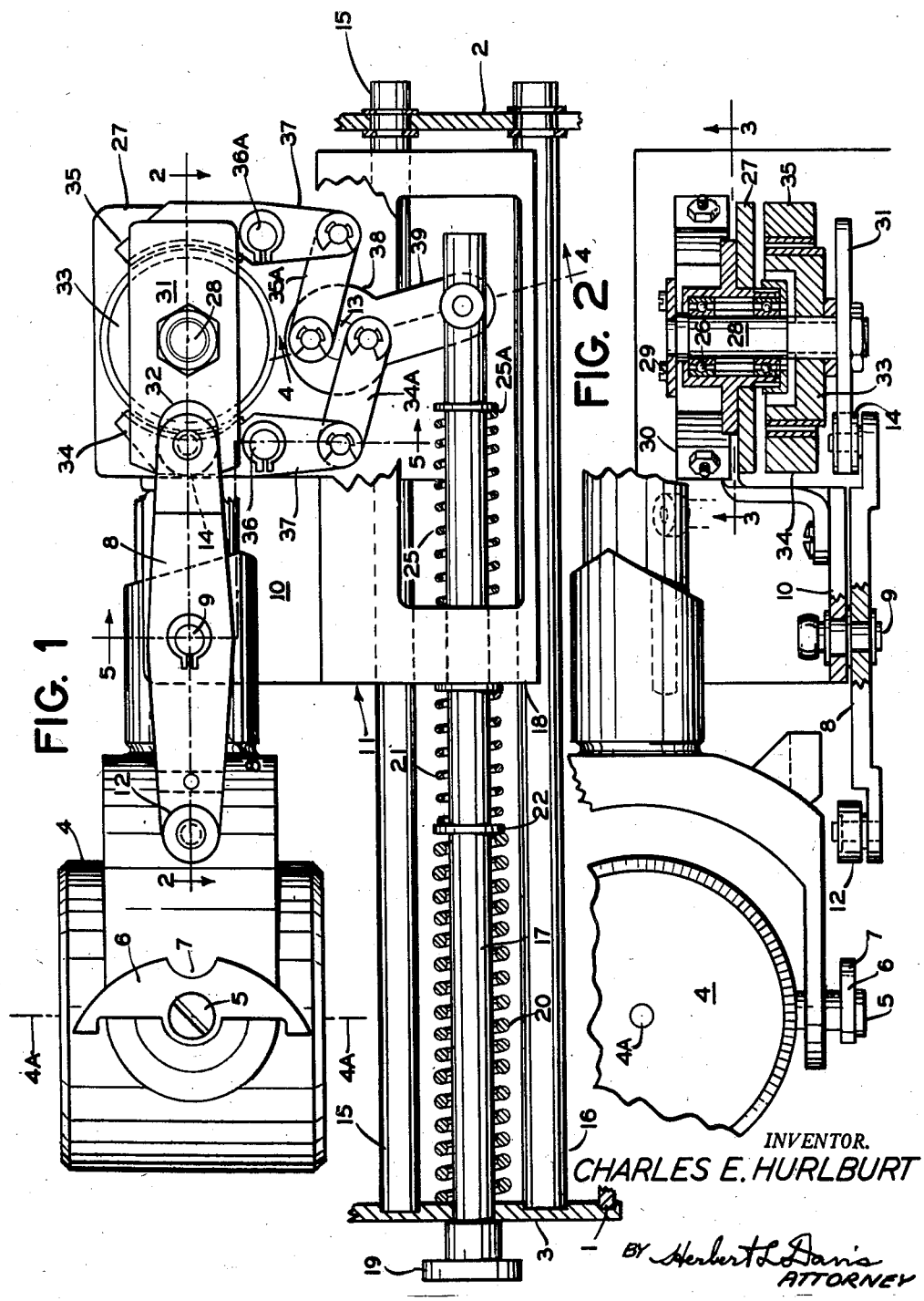
INVENTOR.
CHARLES E. HURLBURT
BY Herbert L. Davis
ATTORNEY Jan. 6, 1959   C. E. HURLBURT   2,867,122
GYRO CAGING MECHANISM
Filed May 28, 1956                              2 Sheets-Sheet 2
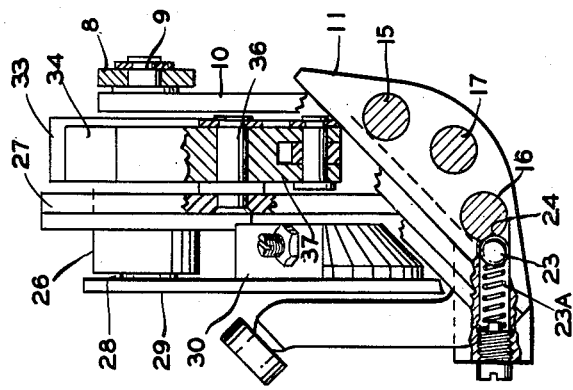
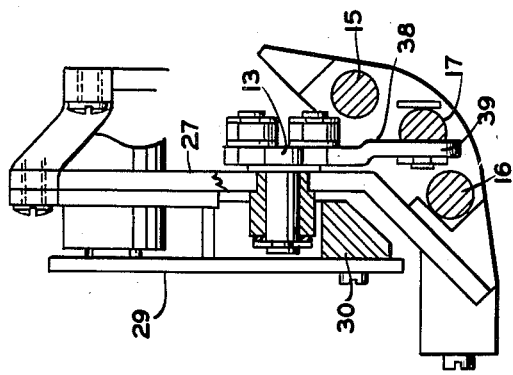
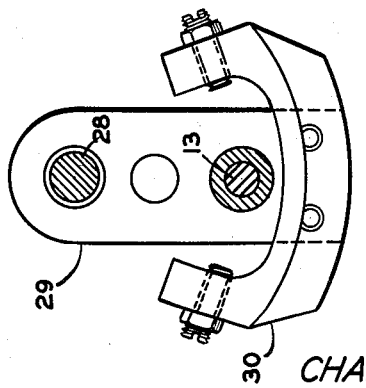
INVENTOR.
CHARLES E. HURLBURT
BY Herbert L. Davis
ATTORNEY

United States Patent Office 2,867,122
Patented Jan. 6, 1959

2,867,122
GYRO CAGING MECHANISM

Charles E. Hurlburt, River Edge, N. J., assignor to Bendix Aviation Corporation, Teterboro, N. J., a corporation of Delaware Application May 28, 1956, Serial No. 587,837

12 Claims. (Cl. 74—5.1)

This invention concerns gyro caging mechanism of an improved and practical type which, while having wide application, finds particular use in an aircraft attitude indicator instrument of a type such as disclosed in the copending U. S. application for patent Serial No. 580,646, filed April 25, 1956, by Paul E. Seifried, and assigned to Bendix Aviation Corporation, assignee of the present application.

Often it is desired to cage an attitude gyro while the plane is in a pitch position, either in flight or on the ground. Conventional caging mechanisms merely centralize the gyro to bring the spin axis thereof to an angle which, while normal to the axes of the aircraft, will not be in a vertical position unless the craft is in horizontal level position.

The subject new instrument, with its self-contained gyro, includes novel means for eliminating a potential source of unreliability heretofore found inherent in conventional systems in that in previous units a major cause of some unsatisfactory operation of such units has been due to the fact that, when caged, the gyro spin axis is caused to assume a position normal to the fore-aft axis of the aircraft. Instructions to the pilot have been to fly straight and level and cage the gyro if for some reason its indication became incorrect. However, with the varying angle of attack of modern high speed aircraft, the result is that caging the gyro causes it to assume a position differing from true vertical by the angle of attack. The present invention eliminates the angle of attack error in caging by using a free pendulum, rather than the case of the unit, as a reference in determining the gyro caged position.

Thus, there has been designed a caging mechanism which permits caging of the gyro to a vertical position irrespective of whether the aircraft in which the instrument is embodied is in a horizontal level attitude or in a pitch attitude.

A feature of the invention is certain camming means for caging the gyro and associated pendulum operated means for controlling the action of the camming means, whereby the camming means when actuated will always bring the gyro to vertical position though the associated aircraft be in a pitch or horizontal attitude.

Another feature of the invention is slide means associated with the pendulum control and cam means, whereby the gyro may be caged to vertical position by a single operation of the slide means.

A further feature of the invention is certain mechanism for locking the position of the pendulum control at the start of a caging operation so as to insure a proper cooperation of the slide and cam means to effect caging of the gyro to its vertical position.

The invention further lies in the particular construction and arrangement of the component parts thereof, as well as in their cooperative association with one another to effect the results intended.

The foregoing and other objects and advantages of the invention will appear more fully hereinafter from a consideration of the detailed description which follows, taken together with the accompanying drawings wherein an embodiment of the invention is illustrated. It is to be expressly understood, however, that the drawings are for purposes of illustration and description, and are not to be construed as defining the limits of the invention.

In the drawings:

Fig. 1 is a side elevational view of a vertical gyro instrument embodying the invention, certain parts being cut away to better illustrate the invention;

Fig. 2 is a plan view of Fig. 1;

Fig. 3 is a section taken on line 3—3 of Fig. 2;

Fig. 4 is a section taken on line 4—4 of Fig. 1; and

Fig. 5 is a section taken on line 5—5 of Fig. 1.

For a more detailed description of the invention reference is now directed to the drawings, wherein there is shown a vertical gyro horizon indicator instrument of a type, for example, such as disclosed in the aforenoted pending application Serial No. 580,646. The instrument is supported in a conventional container or housing 1 of which a portion 2 of the rear end wall, and a part 3 of the bezel at the front are shown in Fig. 1. Housed in the container 1 is a vertical gyro bearing case 4 in which is rotatably mounted a gyro on a vertical spin axis 4-A. The case 4 is further rotatable on a pitch or horizontal axis defined by a pair of suitably supported trunnions 5 at opposite sides thereof, only one being shown.

Fixed on a trunnion 5 is a semi-circular or cardioid type cam 6 having a locking well 7 at the mid-point of its periphery.

A lever 8 for actuating the cam 6 is pivoted at its mid-point 9 to a face of an upright wall 10 of a carriage block 11, and it carries at opposite ends roller elements 12 and 14. Block 11 is slidably mounted on a pair of tracks 15, 16, disposed longitudinally in the container and retained at their rear ends in the container wall 2. The carriage block has a normal position at the rear of the tracks, and is slidable forwardly to carry roller 12 of lever 8 into camming engagement with the periphery of cam 6. Actuation of the cam 6 rotates it and the gyro case 4 as a unit. When the roller enters cam well 7, the gyro is held in caged position.

A pull or caging rod 17, disposed in the container in parallel relation to the track members is used to draw the carriage forwardly along the tracks. This rod extends freely through an upright piece 18 of the carriage block, and projects at its forward end through bezel 3. A hand-operated control knob 19 is fixed upon this projecting end. On this rod between bezel 3 and the front face of the upright 18 is confined a pair of coil springs 20 and 21 separated from one another by a washer 22, spring 21 adjacent the upright member being weaker than the other spring 20. The carriage is urged by these springs to a normal position at the rear of the tracks in which, as shown in Fig. 5, a detent ball 23 housed in the carriage block 11 acts in a notch 24 in the rod 16 and under force of a spring 23-A to releasably secure the carriage block 11 in the latter position.

A coil spring 25 confined on rod 17 between the rear face of upright piece 18 of the carriage block 11 and a snap ring 25-A fixed on the rod 17, cushions the rod 17 at its rearmost position. Abutment of knob 19 against the bezel front 3 controls the rearward extension of rod 17.

In the normal position of the carriage, roller 12 is free of cam 6 and the latter has a normal position, when the gyro is vertical, wherein the well 7 of the cam 6 is at the position as shown in Fig. 1. Lever 8 under normal operating conditions will be in direct alignment with the position of the cam well 7.

As shown in Fig. 5, pendulum means is provided to adjust lever 8 for varying flight conditions of the aircraft. Rotatable in a bearing 26 supported in an upright wall 27 of the carriage block 11 is a stub shaft 28. Fixed to one end of the latter is a pendulum 29 weighted, as at 30, at its lower end; fixed to the opposite end of shaft 28 is a leveling plate 31, as shown by Figs. 1 and 2, in an end of which is a slot 32 engaging the other roller 14 of lever 8. The pendulum, acting through plate 31, serves to constantly vary the position of lever 8 with varying pitch conditions of the aircraft. It can be seen by this cooperative association of elements that, whether the aircraft in which the instrument is embodied is in a level or pitch attitude, the pendulum will adjust the lever 8 so that the subsequent camming engagement of roller 12 with cam 6 will actuate the latter to erect the gyro, the gyro becoming vertically erect upon engagement of the roller in the cam well 7.

Braking mechanism is provided to lock the pendulum 29 before a camming action of lever 8 and cam 6 takes place so that actuation of the lever 8 against the cam 6 will not cause pivoting of the lever 8 and, as a consequence, a faulty erection of the gyro, as might otherwise occur.

The braking mechanism includes a brake drum 33 fixed on the pendulum shaft 28. Engageable against opposite peripheral portions of the drum 33 is a pair of brake shoes 34, 35. Brake shoe 34 pivots on a pin 36 projecting from the face of the upright wall 27; brake shoe 35 pivots at the right on a similar pin 36–A. Pivoted on a pin support below the drum and midway between tail portions 37 of the brake shoes, is a braking plate 38. The tail portion of shoe 34 is linked at 34–A to the braking plate at a point below the pivot point 13 of the latter; and the tail portion 37 of the other shoe 35 is similarly linked at 35–A to a corresponding point above the pivot point 13. A tail piece 39 depending from the braking plate 38 is pivoted to a rear flat face of the caging rod 17. The arrangement is such that a manual pull on rod 17 engages the brake shoes with equal pressure against opposite surfaces of the drum 33 and thereby effectively locks the pendulum 29 against oscillation. Locking the pendulum 29 in turn restrains pivoting of lever 8 from its position as determined by the pendulum 29.

This locking of the pendulum 29 desirably occurs before any movement of the carriage block 11 takes place. The normally engaged detent mechanism 23, 24 places a restraint on movement of the carriage so that, the initial pulling of the caging rod 17, coil spring 25 compresses as the pull rod 17 actuates the braking plate 38 so as to initially effect braking of the pendulum drum 33. Subsequent increased force exerted on the caging rod 17 releases the detent 23 from the notch 24 and draws the carriage 11 forwardly against the tension of springs 20 and 21. Movement of the carriage 11 carries roller 12 of lever 8 to engage cam 6 so as to cause the caging and erection of the gyro in case 4 to the vertical position.

When the caging rod is manually released, springs 20 and 21 return the carriage 11 and caging rod 17 to normal position, in which the spring pressed detent ball 23 is once again re-engaged in notch 24 and the braking mechanism 34 and 35 is released.

While an embodiment of the invention has been illustrated and described in detail, it is to be expressly understood that the invention is not limited thereto. Various changes can be made in the design and arrangement of the parts without departing from the spirit and scope of the invention, as the same will now be understood by those skilled in the art; and it is my intent, therefore, to claim the invention not only in the form shown and described, but also in all such forms and modifications as may reasonably be construed to lie within the spirit of the invention and the scope of the appended claims.

What is claimed is:

1. In combination, a vertical gyro bearing case having freedom on a horizontal axis, a cam actuable to rotate the case and arrestable upon the case being brought to a level position, a camming member movable to actuate the cam and adapted to arrest the same upon the case being brought to the level position, pendulous means for adjusting the camming member and thereby the said level position of the case; and common means for first locking the pendulous means against oscillation and then moving the camming member to actuate the cam.

2. In combination, a vertical gyro bearing case having trunnions supported to define a horizontal axis for the case, a cardioid cam integral with one of the trunnions and actuable for effecting rotation of the case to a level position, a camming member movable into engagement with the cardioid cam for actuating the same to effect rotation of the case to the level position and engageable in a locking recess of the cam upon leveling of the case, pendulous means for adjusting the camming member, and means for locking the pendulous means against oscillation prior to movement of the camming member.

3. The combination defined by claim 2 wherein common means is provided for first effecting the locking of the pendulous means and subsequently moving the level camming member into engagement with the cardioid cam.

4. In combination, a vertical gyro bearing case having a horizontal axis of rotation, a cardioid cam fixed to the case and actuable for effecting rotation of the case to a level position, a camming member movable into engagement with the cardioid cam for actuating the same to effect rotation of the case to the level position and engageable in a locking recess of the cam upon leveling of the case, means to adjustably position the camming member including pendulous means, and brake means for locking the pendulous means against oscillation prior to the movement of the camming member into engagement with the cardioid cam.

5. The combination defined by claim 4 wherein common means is provided for first operating the brake means to lock the pendulous means and subsequently moving the camming member into engagement with the cardioid cam.

6. Mechanism for caging a vertical gyro to a vertical position though the housing supporting the gyro be in a pitch position, comprising a housing subject to pitch movement, a vertical gyro bearing casing supported in the housing for pitch movement on a horizontal axis, means for camming the casing to a level position, pendulous means to adjust the camming means, and means for first locking the pendulous means and subsequently actuating the camming means to cam the casing to the level position.

7. A caging mechanism comprising a pivotable camming member for engaging a cam surface of a rotatable device, a pendulum, linkage controlled by the pendulum for actuating the camming member, and brake mechanism for locking the pendulum and as a consequence the camming member prior to engagement of the camming member with the cam surface.

8. In caging mechanism as in claim 7 wherein common means is provided for first locking the pendulum and subsequently engaging the camming member with the cam surface.

9. In combination, a vertical gyro bearing case having a pitch axis and including a cam surface having a locking recess, a slidably supported carriage block, a member pivoted on the block for engaging the cam surface to effect rotation of the case on its pitch axis to a level position and engageable in the locking recess when the latter position has been reached, pendulous means to adjust the pivoted member so as to variably position the member with change in the pitch condition of the aircraft to ensure that the gyro becomes vertically erect upon the member engaging in the locking recess, brake means for locking the pendulous means against oscillation, and means common to both the brake means and the carriage for first actuating the brake to lock the pendulous means and pivoted member in the adjusted position and subsequently sliding the carriage block to carry the pivoted member into camming engagement with the cam surface.

10. In a caging mechanism for a vertical gyro, a shaft rotatable in a support, a pendulum fixed to an end of the shaft continuously seeking a vertical position relative to angular movement of the support, and a plate fixed to the opposite end of the shaft having a slot engaging an end of a pivotable member, the slot in said plate extending perpendicular to the position of the pendulum, a brake drum fixed upon the shaft, and means for braking the drum by exerting equal pressure thereon from opposite sides for fixedly positioning the slot relative to the pivotal member.

11. In a caging mechanism for a vertical gyro, a rotatable member having a cam surface, a pivoted member for effecting a camming action against the cam surface to erect the gyro to a desired vertical position, pendulum controlled means effective upon change in the desired vertical position relative to said member for continuously adjusting the pivoted member preparatory to such camming action, and brake means effective for locking the pendulum against oscillation and to prevent a pivoting of the pivoted member from its adjusted position.

12. In a caging mechanism for a vertical gyro, a rotatable member having a cam surface, pivoted camming means for engaging the cam surface and effecting rotation of the rotatable member so as to erect the gyro to a vertical position; pendulum controlled means for constantly adjusting the pivoted camming means with changes in the position of the pendulum to effect the camming action, brake means for locking the pendulum controlled means against oscillation and as a consequence preventing pivoting of the pivoted member from its position, and manual control means for actuating the brake means.

References Cited in the file of this patent

UNITED STATES PATENTS

| | | |
|---|---|---|
| 2,297,265 | Von Manteuffel | Sept. 29, 1942 |
| 2,328,744 | Roters | Sept. 7, 1943 |
| 2,441,157 | Kissel | May 11, 1948 |
| 2,630,017 | Slater | Mar. 3, 1953 |
| 2,716,344 | Seifried | Aug. 30, 1955 |